US006480278B1

(12) United States Patent
Fuerstenau et al.

(10) Patent No.: US 6,480,278 B1
(45) Date of Patent: Nov. 12, 2002

(54) METHOD AND APPARATUS FOR DETECTION OF CHARGE ON IONS AND PARTICLES

(76) Inventors: Stephen Douglas Fuerstenau, 3938 Park Pl., Montrose, CA (US) 91020; George Arthur Soli, 4003 Wanna Vista Dr., Vancouver, WA (US) 98661

( * ) Notice: Subject to any disclaimer, the term of this patent is extended or adjusted under 35 U.S.C. 154(b) by 0 days.

(21) Appl. No.: 09/581,711

(22) PCT Filed: Dec. 16, 1998

(86) PCT No.: PCT/US98/26880

§ 371 (c)(1), (2), (4) Date: Aug. 28, 2000

(87) PCT Pub. No.: WO99/31707

PCT Pub. Date: Jun. 24, 1999

Related U.S. Application Data

(60) Provisional application No. 60/069,752, filed on Dec. 16, 1997.

(51) Int. Cl.[7] .......................... G01B 11/00; B01D 59/44

(52) U.S. Cl. ........................ 356/394; 250/283; 250/281

(58) Field of Search .......................... 356/30, 301, 304; 250/272, 461, 281, 282, 283, 286, 287, 397

(56) References Cited

U.S. PATENT DOCUMENTS 4,267,525 A * 5/1981 Silfvast et al. ............. 331/94.5
4,394,580 A * 7/1983 Gielisse ................... 250/461.1
5,068,539 A 11/1991 Nogami et al. .......... 250/492.2
5,073,713 A * 12/1991 Smith et al. ................ 250/282
5,180,918 A * 1/1993 Isobe ...................... 250/492.2
5,591,969 A * 1/1997 Park et al. .................. 250/287
5,757,012 A * 5/1998 Turner et al. ............... 250/397
5,770,857 A 6/1998 Fuerstenau et al. ......... 250/281
5,781,012 A * 7/1998 Yasuda ....................... 324/399
5,903,002 A * 5/1999 Turner et al. ............... 250/281

OTHER PUBLICATIONS

Fuerstenau, Stephen D. and Benner W. Henry; "Molecular Weight Determination of Megadalton DNA Electrospray Ions Using Charge Detection Time–of–Flight Mass Spectrometry"; Rapid Communications in Mass Spectrometry; vol. 9; pp 1528–1539; 1995.

Matsumoto, Kazuya, Yurimoto, Hisayoshi; Kosaka, Koji; Miyata, Kenji; Nakamura, Tsutomu and Sueno, Shigeho; "A Novel Ion Imager for Secondary Ion Mass Spectrometry"; IEEE; Log No. 9204310; 1993.

* cited by examiner

*Primary Examiner*—Michael P. Stafira
(74) *Attorney, Agent, or Firm*—Christie, Parker & Hale, LLP

(57) ABSTRACT

The present invention provides a tessellated array detector with charge collecting plate (or cup) electrode pixels and amplifying circuitry integrated into each pixel making it sensitive to external electrostatic charge; a micro collector/amplifier pixel design possessing a small capacitance to ensure a high charge to voltage signal conversion for low noise/high sensitivity operation; a micro-fabricated array of such pixels to create a useful macroscopic target area for ion and charged particle collection.

18 Claims, 7 Drawing Sheets

METHOD AND APPARATUS FOR DETECTION OF CHARGE ON IONS AND PARTICLES

CROSS-REFERENCE TO RELATED APPLICATIONS

This application is a continuation of PCT Application No. PCT/US98/26880, filed Dec. 16, 1998, which claims priority of provisional application No. 60/069,752, filed on Dec. 16, 1997.

STATEMENT REGARDING FEDERALLY SPONSORED RESEARCH OR DEVELOPMENT

This invention was made with U.S. Government support under Contract No. NAS 7-1260 between the National Aeronautical and Space Administration and the California Institute of Technology for the operation of the Jet Propulsion Laboratory and under Contract No. DE-AC03-76F00098 between the U.S. Department of Energy and the University of California for the operation of Lawrence Berkeley Laboratory. The U.S. Government may have certain rights in this invention.

FIELD OF THE INVENTION

This invention relates generally to the measurement of charge on ions and particles, and more specifically to the measurement of such charge using an array detector.

BACKGROUND OF THE INVENTION

In certain devices and as part of some measurement techniques it is desirable to quantify, with high precision and sensitivity, the charge on individual gas phase ions (including molecular ions and charged particles and aerosols). This charge may range in size from a few tens of electrons to tens of thousands of electrons or higher, and may be created on the particle by a number of means both by naturally occurring processes or by deliberate ionization methods, including electrospray ionization, corona discharge, UV light irradiation and others. These ions, whose primary characteristic is that of being multiply charged, i.e., carrying more than a single unit charge, are generally quite massive having molecular weights that are measured in hundreds of thousands of atomic mass units at the low end on up to pico-grams at the high end. As consequence these gas phase ions travel with low or near thermal velocity even when they possess substantial amount of kinetic energy such as kilo-electron volts per unit charge. Low velocity ions will not create a signal in detectors that rely on the generation of secondary electrons or ions from a surface, nor on the generation of charge/hole pairs within a semiconductor, such as charge coupled devices (CCD's). These ions will induce a signal in detectors that can respond to the presence of the electrostatic charge carried by an ion. What's more the magnitude of induced signal is generally proportional to the amount of charge detected.

A practical detector for measuring charge on single ions and particles should have a number of useful characteristics. The detector should be sensitive enough to detect and quantify the charge on individual ions with charge as little as less than 100 electrons and have a noise level of not more than a few tens of unit charges. It should respond to low energy ions that come into contact with the detector surface. The detector should also possess a usable working area to which ions may be delivered in order to maintain a reasonable detection efficiency. It should not require vacuum for operation but should be able to operate in vacuum or any ambient gas pressure. Ideally the detector will not require cooling for low noise operation. It should also be compact, robust, and inexpensively fabricated with microelectronic technology. As such the detector CCD detectors have many of the characteristics mentioned above and they detect charge with high sensitivity, but that charge must be created and collected inside the silicon of the device by some energetic process before it can be transferred to an amplifier. The presence of an electrostatic charge is not sufficient to create the necessary physical charge inside the device. CCD's therefore cannot be used to directly sense charge deposited on the surface of their pixels.

SUMMARY OF THE INVENTION

The present invention provides a tessellated array detector with charge collecting plate (or cup) electrode pixels and amplifying circuitry integrated into each pixel making it sensitive to external electrostatic charge; a micro collector/amplifier pixel design possessing a small capacitance to ensure a high charge to voltage signal conversion for low noise/high sensitivity operation; a micro-fabricated array of such pixels to create a useful macroscopic target area for ion and charged particle collection.

DETAILED DESCRIPTION OF THE PREFERRED EMBODIMENT

Figure 1:
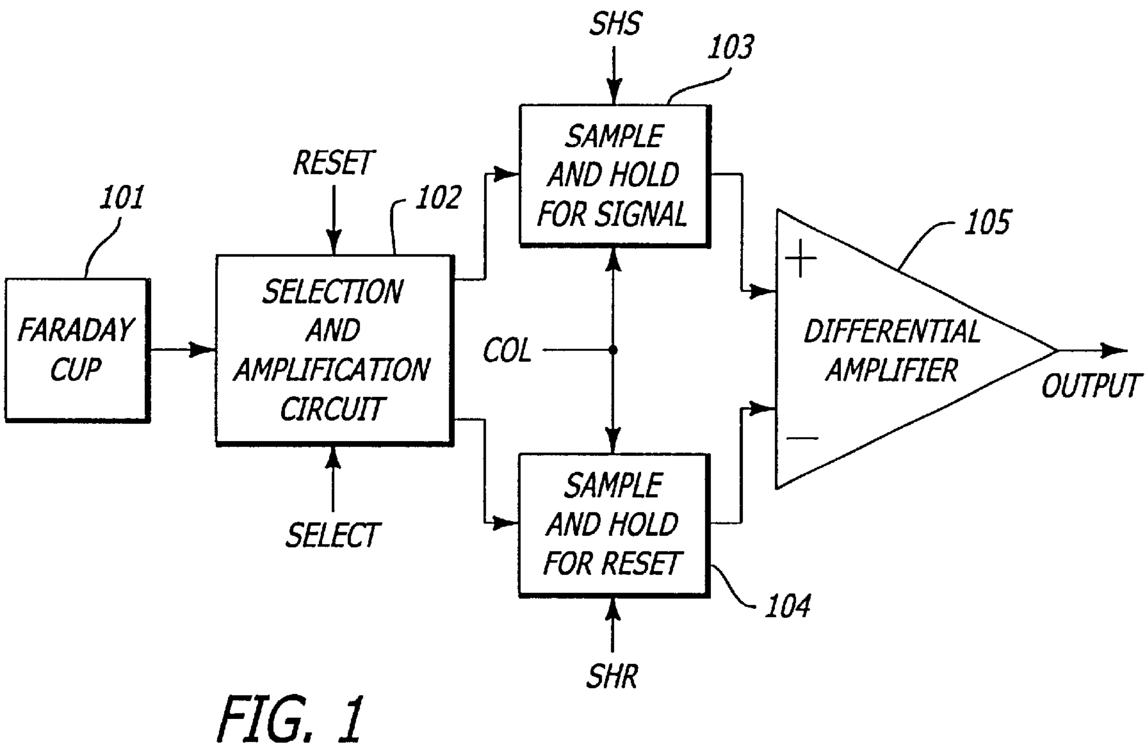
FIG. 1 is a block diagram illustrating one embodiment of a detector according to the invention.

Field effect transistors (FETs) are highly sensitive amplifier elements that are commonly integrated into microelectronic circuitry. FETs are used amplify a current in response to small voltage changes that occur at the FET input gate electrode. To measure an amount of charge with a FET, a capacitance C is charged with a charge Q to induce a voltage V=Q/C, which is then impressed onto the FET input gate via an electrical connection. In order to achieve high sensitivity the value of C, specifically the capacitance ofthe collecting electrode plus the FET input gate electrode structure, should be made as small as possible.

Accordingly, all things being equal, the most sensitive FET amplifier for a discrete charge will be the one built from a micro-fabricated FET connected to an equally small collecting electrode. For example the input capacitance of a 10 micron by 10 micron collector and FET is measured in femto-farads and can exhibit measurable charge to voltage conversion gains of 10 microvolts per electron.

The drawback associated with an amplifier whose dimensions are measured in microns is the extremely small target area it presents to a source of ions or charged particles. In order to create a useful detector area, an array of electrodes is employed that together exhibits a useful target area for ion collection. In some applications is may not be critical that the distance between pixels remain small and that 'dead area' be kept to a minimum. Spreading out the pixels may be useful in minimizing pixel to pixel capacitance. Put in another way, some applications will only require a sufficient total active target area and will not be affected by inactive regions between pixels. In other applications, the fact that the invented detector will collect position information in addition to charge information may be of added utility, but the primary driver for pixelation in the detector is to reduce capacitance on the amplifying structures. Such useful features of the detector are anticipated.

In a typical detector signal that has accumulated on a pixel is stored until the signal on that pixel is read out by addressing the pixel with appropriate readout electronics. After readout the voltage on the pixel is then 'reset' by closing a switch which allows charge to flow into the pixel and establish a voltage that may be arbitrarily set. In the case where the incoming charge from the ion is mobile it may flow onto the collecting electrode and off of it when the reset switch is closed. In the event that the incoming charge is not free to flow off of the ion it will remain at the surface of the electrode attached to the ion where it will induce in the pixel an image charge which becomes the signal that is registered during readout. Upon reset charge of opposite polarity to the ion charge will flow onto the pixel to exactly compensate the effect of the ion charge still present at the collector surface. At a distance of one or more pixel diameters the collecting electrode will appear to be neutral after reset.

A tessellated array detector provides a unique capability to directly measure charge on individual, multiply charged ions and particles. In order to use a tessellated array detector for measuring charge on individual ions the flux of such ions to the detector must be sufficiently low such that only one ion lands on a given pixel during the charge integration period that occurs between successive reads of the pixel. Under such conditions one may infer that the signal observed on any pixel is due to the presence of a single multiply charged ion. The condition is checked by observing that the vast majority of pixels indicate zero signal during any given read. Alternatively one may restrict the delivery of ions to the detector by some other means allowing the passage of only one ion during an integration and read period.

The present invention allows integrated circuits, manufactured in CMOS technology, structured as Faraday-cup arrays for applications requiring low-noise charge or current measurements. Examples of detectors arrays constructed according to the invention have yielded a measured read noise floor of 90 electrons RMS at room temperature. The noise floor would be reduced by reducing the total capacitance, Ct, on the charge storage node in each pixel. The implementation having a measured noise floor of 90 electrons RMS at room temperature has a total capacitance of 254 fF (femto Farads). However, proper design of the device geometry with the same pixel and readout circuitry yields a total capacitance of 31 fF and a calculated read noise of 30 electrons RMS at room temperature. By providing the pixel circuitry with greater than unity gain, the read noise floor can be reduced to a few electrons RMS at room temperature.

CMOS Faraday-cup array detectors are useful for measuring charge on very massive individual molecules. Larger arrays, greater than the current 28×28 design, will be useful for practical applications. Larger arrays may benefit from additional circuitry such as discriminators to trigger pixel readout so that the larger array could be read out very rapidly to maintain low dark current without the need for cooling.

In this application, the term charged particles is used to denote any type of particle having a charge and is understood to encompass ions, charged droplets, charged powder, charged molecules, charged aerosols, and similar forms of matter having a charge. The term Faraday cup is used in this application to refer to any type of conductive element for collecting charge, including for example planar surfaces, curved surfaces, convex or concave structures, etched structures, as well as structures exhibiting properties such as porosity or sponginess. These elements may be of a one-, two-, or three dimensional nature.

FIG. 1 is a block diagram illustrating one embodiment of a detector according to the invention. The detector comprises Faraday cup 101, selection and amplification circuit 102, sample and hold circuit 103 for holding a signal level, sample and hold circuit 104 for holding a reset level, and differential amplifier 105. Faraday cup 101 is coupled to selection and amplification circuit 102. Selection and amplification circuit 102 has a reset input for receiving a reset signal for resetting Faraday cup 101 and a select input for receiving a select signal for selecting the Faraday cup 101. Selection and amplification circuit 102 is coupled to sample and hold circuit 103 for holding a signal level. Sample and hold circuit 103 has an SHS input for receiving an SHS signal for sampling and holding a signal level.

Selection and amplification circuit 102 is also coupled to sample and hold circuit 104 for holding a reset level. Sample and hold circuit 104 has an SHR input for receiving an SHR signal for sampling and holding a reset level. Both sample and hold circuit 103 and sample and hold circuit 104 are coupled to a differential amplifier 105. Both sample and hold circuit 103 and sample and hold circuit 104 have a column input for receiving a column input for selecting a particular column for output to differential amplifier 105. Differential amplifier 105 produces an output representative of the difference between the signal level and the reset level.

Figure 2:
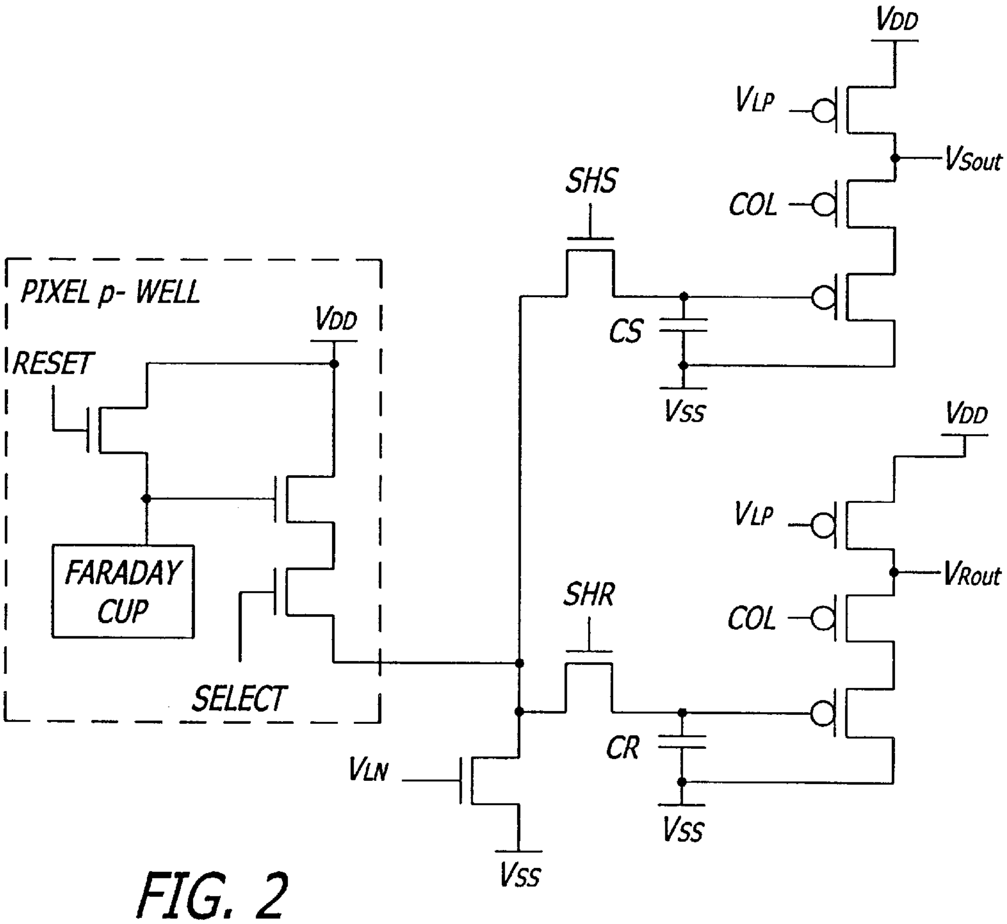
FIG. 2 is a schematic diagram illustrating one embodiment of a detector according to the invention.

FIG. 2 is a schematic diagram illustrating one embodiment of a detector according to the invention. The detector may be fabricated using complementary metaloxide semiconductor (CMOS) techniques. In one embodiment, the CMOS Faraday-cup array chip is a 28×28 array of pixels, each with a 40×40 $\mu$m pitch. In that embodiment, the charge detecting area in each pixel is a 36×36 $\mu$m metal2 layer that covers the pixel. The metal2 detecting area over each pixel measures the image charge of a massive molecule that sticks to its surface. The chip can be used for measuring positive or negative image charge. Charge exchange between a massive charged molecule and a pixel is not required for charge measurement. The CMOS array was fabricated in 2 $\mu$m p-well technology through MOSIS.

The CMOS Faraday-cup pixel circuit schematic shows a circuit for a pixel, with row reset and row select, and column sample and hold capacitors and output circuitry. The pixel unit cell consists of a metal2 Faraday-cup, a source-follower input transistor, a row-selection transistor, and a row-reset transistor. At the bottom of each column of pixels, there is a load transistor VLN and two output branches to store the reset and signal levels. Each branch consists of a sample and hold capacitor (CS or CR) with a sampling switch (SHS or SHR) and a second source-follower with a column-selection switch (COL). The reset and signal levels are read out differentially, suppressing fixed pattern noise (not kTC noise) from the pixel. If the signal levels are read out twice, once before integration and once after integration, kTC noise is also suppressed. These readout circuits are common to an entire column of pixels. The load transistors of the second set of source followers (VLP) are common to the entire array.

Figure 4:
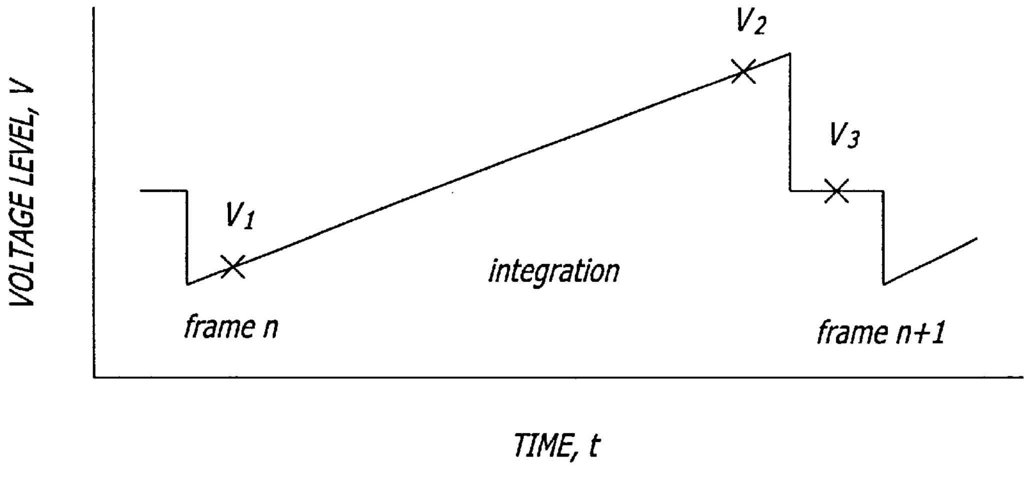
FIG. 4 is a line graph diagram illustrating a voltage level over time for one embodiment of the invention.

FIG. 4 is a line graph diagram illustrating a voltage level over time for one embodiment of the invention. In operation of the circuit of FIG. 2, a row is selected and the signal level V2 is stored on CS. The row is then reset and reset level V3 is stored on CR. Each column is then readout through a differential amplifier giving (V2–V3). This voltage difference can be histogrammmed and a new row selected or stored in memory for kTC noise suppression. For kTC noise suppression the row is be readout twice for each reset. The row is reset and signal level V1 is read out without using CS or measuring the reset level. The row pixels integrate charge and signal level V2 is read out giving a(V2–V1) signal level suppressing kTC noise. These signal and reset voltages are shown in FIG. 4.

FIG. 4 is a voltage level diagram showing reset level V3 and signal levels V1 and V2 as a function of time. The voltage (V2–V 1) is then histogrammed. This operation does not use CR or CS. For typical on-chip capacitor designs the CR and CS kTC noise is about 0.3, in sigma, times the pixel kTC noise without pixel kTC noise suppression.

CMOS Faraday-cup Array Data

Figure 5:
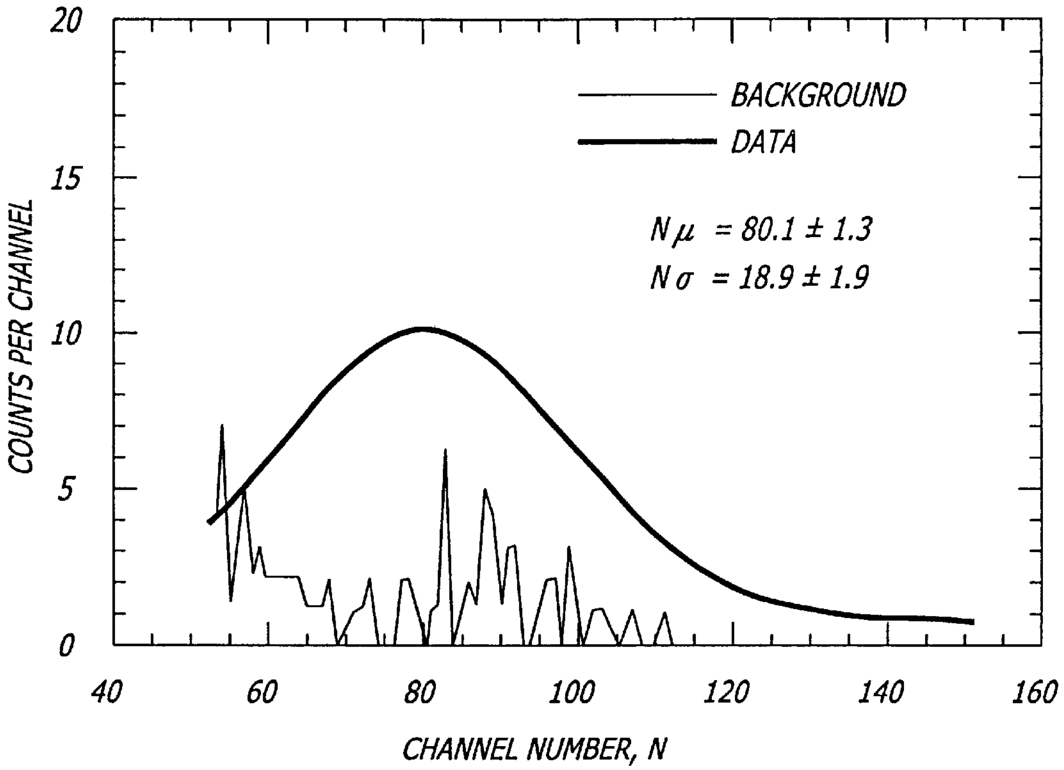
FIG. 5 is a charge distribution diagram illustrating counts per channel over a plurality of channel numbers for one embodiment of the invention.

FIG. 5 is a charge distribution diagram illustrating counts per channel over a plurality of channel numbers for one embodiment of the invention. Droplets of polyethylene glycol with a charge to mass ratio measured by time-of-flight through a Faraday-tube are first charged with an electrospray ionizer and accelerated across a 300 volt potential in vacuum. The charge distribution mean, of 1680±150 electrons, is measured by the Faraday-tube pulse height and the time-of-flight by the Faraday-tube pulse length. The Faraday-tube mean charge provides calibration for the CMOS Faraday-cup array.

During a row read cycle image charge potentials are stored on the column signal capacitors. The row pixels are then reset and the reset potentials are stored on the column reset capacitors. The row reset transistors are then turned off and the row of pixels integrate charge for 1.5 seconds before repeating the row read cycle. The difference between the row pixels signal and reset potentials is then measured with a differential op-amp that produces the input signal to a CAMAC LeCory 3512 ADC operating at 29 $\mu$V/channel. The data are collected in 599 frames over 16 minuets (about 1.6 seconds per frame) with 569 frames containing data above a threshold set at channel 50. The background was collected in 603 frames with 205 frames containing background data.

FIG. 5 shows a distribution of charged droplets and background data with a mean charge of 1680 electrons in channel 80.1. The background noise is generated by the asynchronous chip operation with the CAMAC digital output. The reset pulse is held on for a fluctuating number of CAMAC clock cycles causing the reset level to fluctuate. This problem is overcome by not measuring the reset level and histogramming (V2–V1) as shown in FIG. 6.

Figure 6:
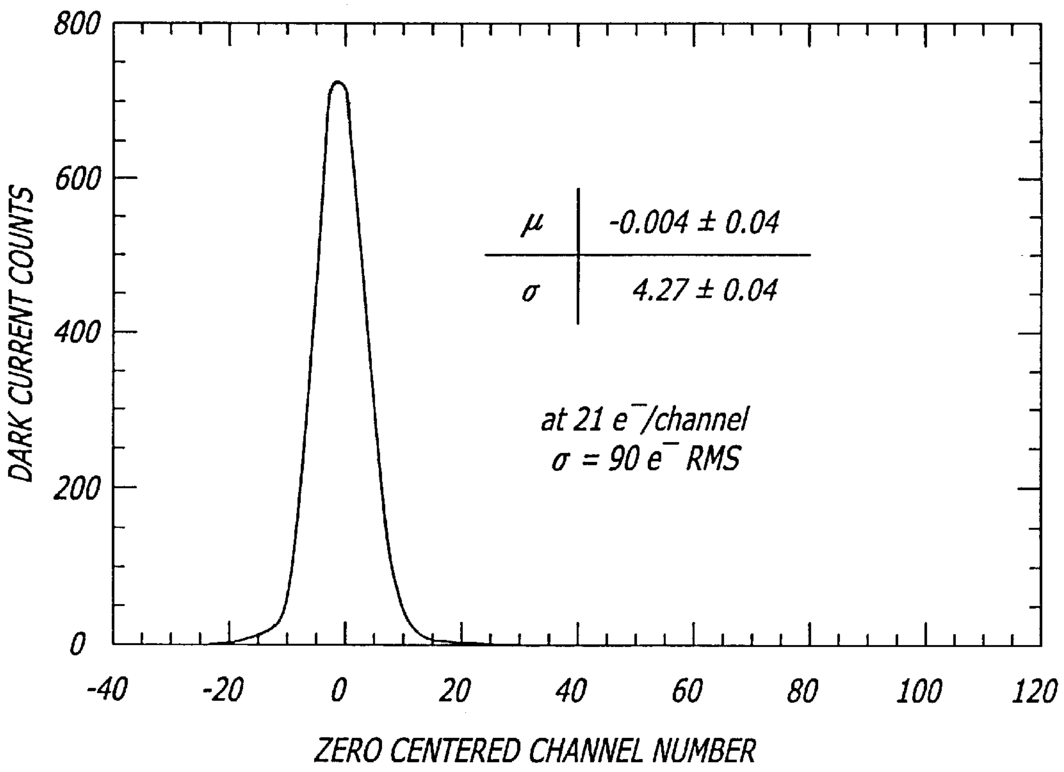
FIG. 6 is a dark current histogram diagram showing dark current counts over a zero centered channel number for one embodiment ofthe invention at room temperature showing a 90 electron RMS noise level.

FIG. 6 is a dark current histogram diagram showing dark current counts over a zero centered channel number for one embodiment ofthe invention at room temperature showing a 90 electron RMS noise level. The asynchronous mode of operation also suppresses kTC noise as described above and measures a read noise floor plus dark current of 90 electrons RMS at room temperature. Dark current is generated over a 60 ms frame time and is generated at a rate of 20 $\mu$V/ms giving a dark current noise of 30 electrons RMS. These dark current electrons can be removed by cooling or by making several measurements around V1 and V2 and averaging. The remaining 85 electrons RMS read noise are tied to process parameters and can be reduced by circuit design.

The invention may be practiced in embodiments that are not configured to include source follower circuits. Other tessellated array detector and amplifier configurations include CMOS infrared readout arrays, operational amplifiers, charge transimpedance amplifiers (CTIA), guarding (actively driving a conductive structure in proximity to a Faraday cup with a voltage to increase the signal-to-noise ratio), etc.

The invention may be practiced in embodiments that are not configured to include sample and hold readouts, for example, integrators and threshold circuits.

Figure 3:
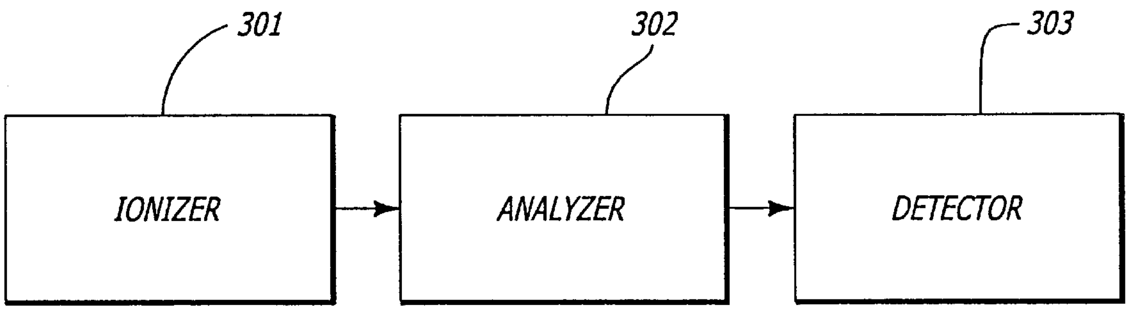
FIG. 3 is a block diagram illustrating one embodiment of a charge detection mass spectrometer (CDMS) according to the invention.

FIG. 3 is a block diagram illustrating one use of the invention as applied to a charge detection mass spectrometer (CDMS). The CDMS comprises an ionizer 301, an analyzer 302, and a detector 303. Ionizer 301 produces a stream of charged particles directed toward analyzer 302, and ultimately toward detector 303. Ionizer 301 may be any suitable source of charged particles, and may employ, for example, electrospray ionization, corona discharge, UV light irradiation, or other suitable techniques. Analyzer 302 analyzes a property or properties ofthe charged particles, for example, their velocity, mass, and/or charge. Analyzer 302 may be any suitable type of analyzer, which provides mass-to-charge ratio information about those charged particles.

From analyzer 302, the charged particles travel toward detector 303. Detector 303 is a detector for detecting electrostatic charge. The detector may comprise a plurality of smaller detectors, each smaller detector being independently capable of detecting electrostatic charge. The smaller detectors may be configured in an array, for example a rectilinear array, forming a planar surface. Upon arrival of a charged particle at a detector, the charge of the charged particle may be measured.

The detector 303 is bombarded by multiply charged particles or ions which may be generated with electrospray ionization and in conjunction with a methodology for assigning a mass-to-charge ratio value to each particle or ion that is measured by detector 303. Determination of the mass-to-charge ratio can be accomplished with a velocity selector or a quadrupole mass filter tuned to filter ions with very large mass-to-charge ratios. The technique can be used to obtain mass information on large polymer ions, charged particles, and droplets including chromosomes, viruses, and bacteria.

Examples of Methods for Practicing the Invention

Figure 7:
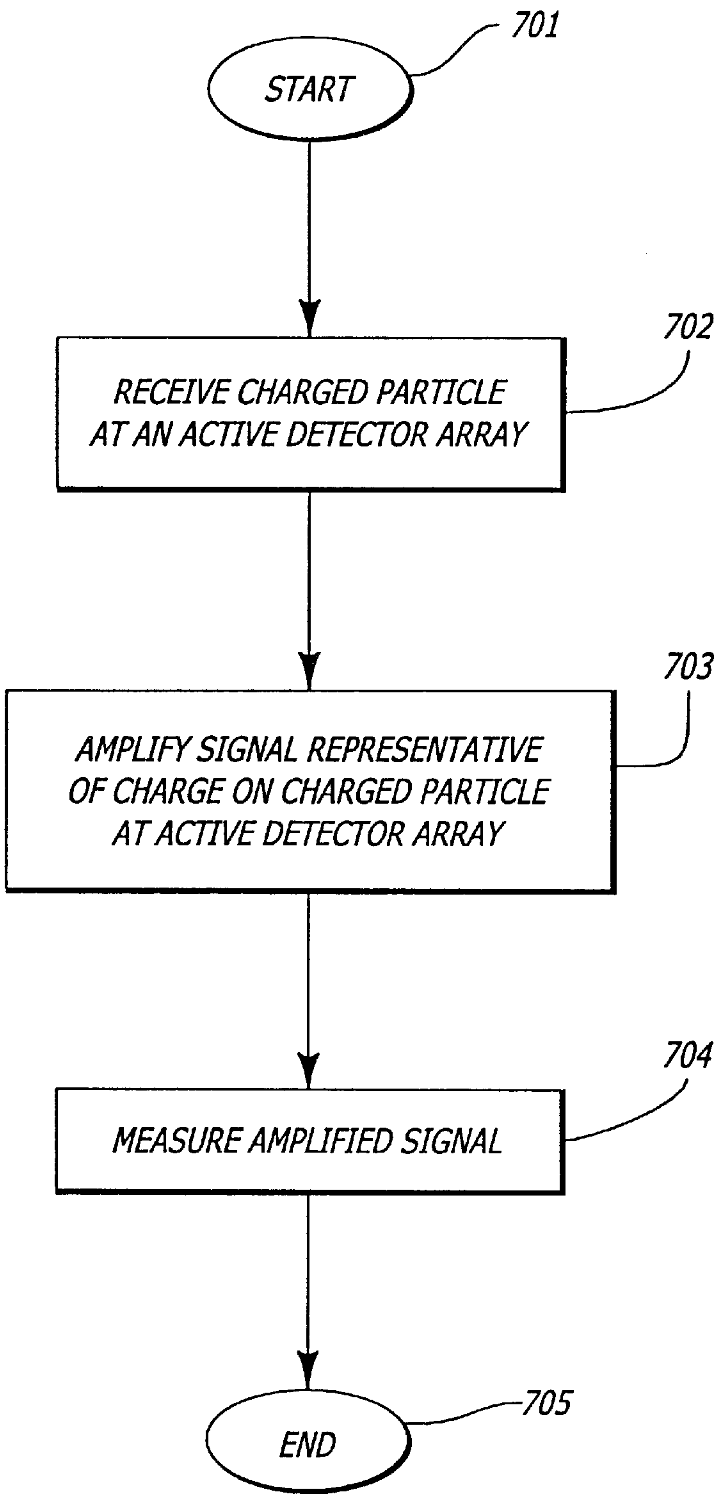
FIG. 7 is a flow chart diagram illustrating one embodiment of a method for detecting charged particles according to the invention.

FIG. 7 is a flow chart diagram illustrating one embodiment of a method for detecting charged particles according to the invention. The method begins in step 701 and proceeds to step 702. In step 702, a charged particle is received at an active detector array. In step 703, a signal representative of charge on the charged particle at the active detector array is amplified. In step 704, the amplified signal is measured. In step 705, the method ends.

Figure 8:
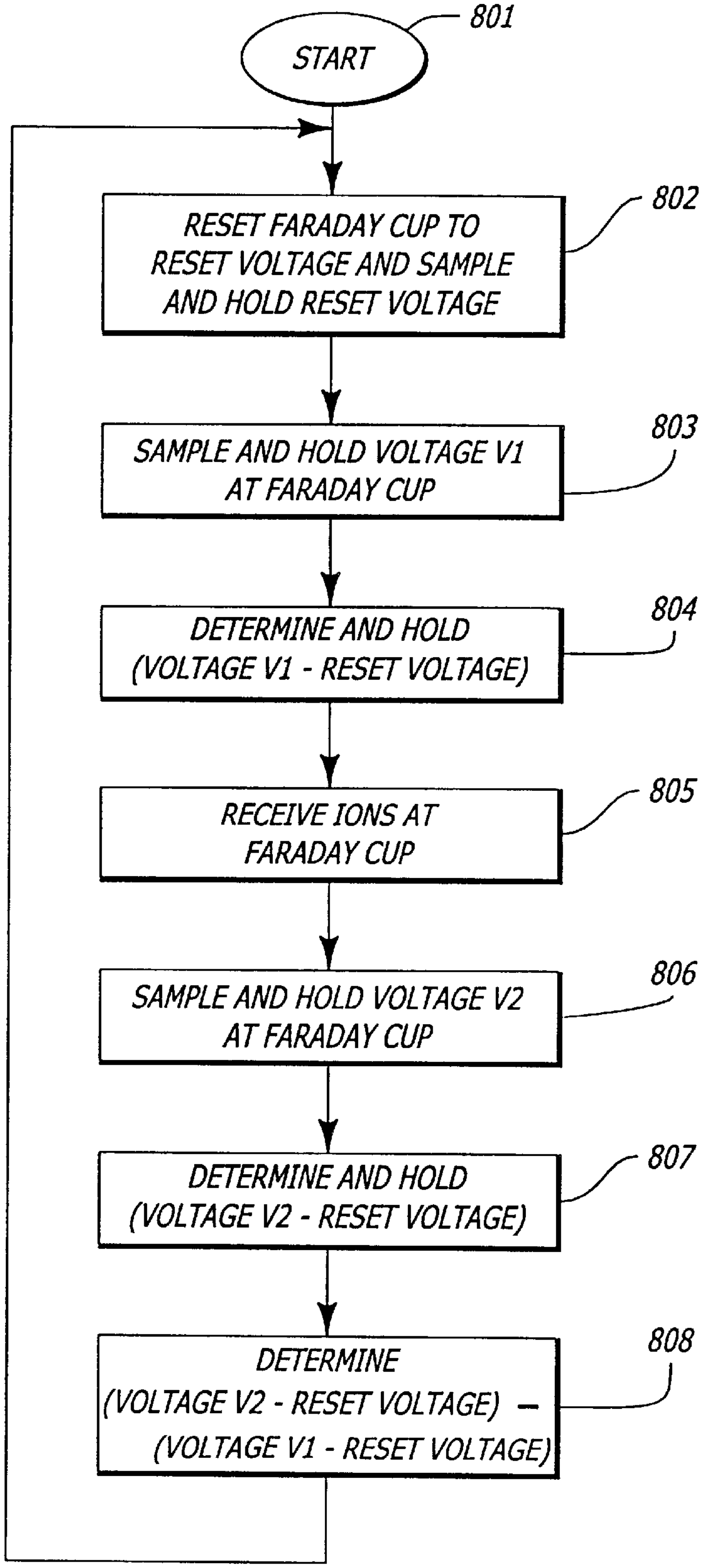
FIG. 8 is a flow chart diagram illustrating one embodiment of a method for sensing charge on a detector according to the invention.
Figure 9:
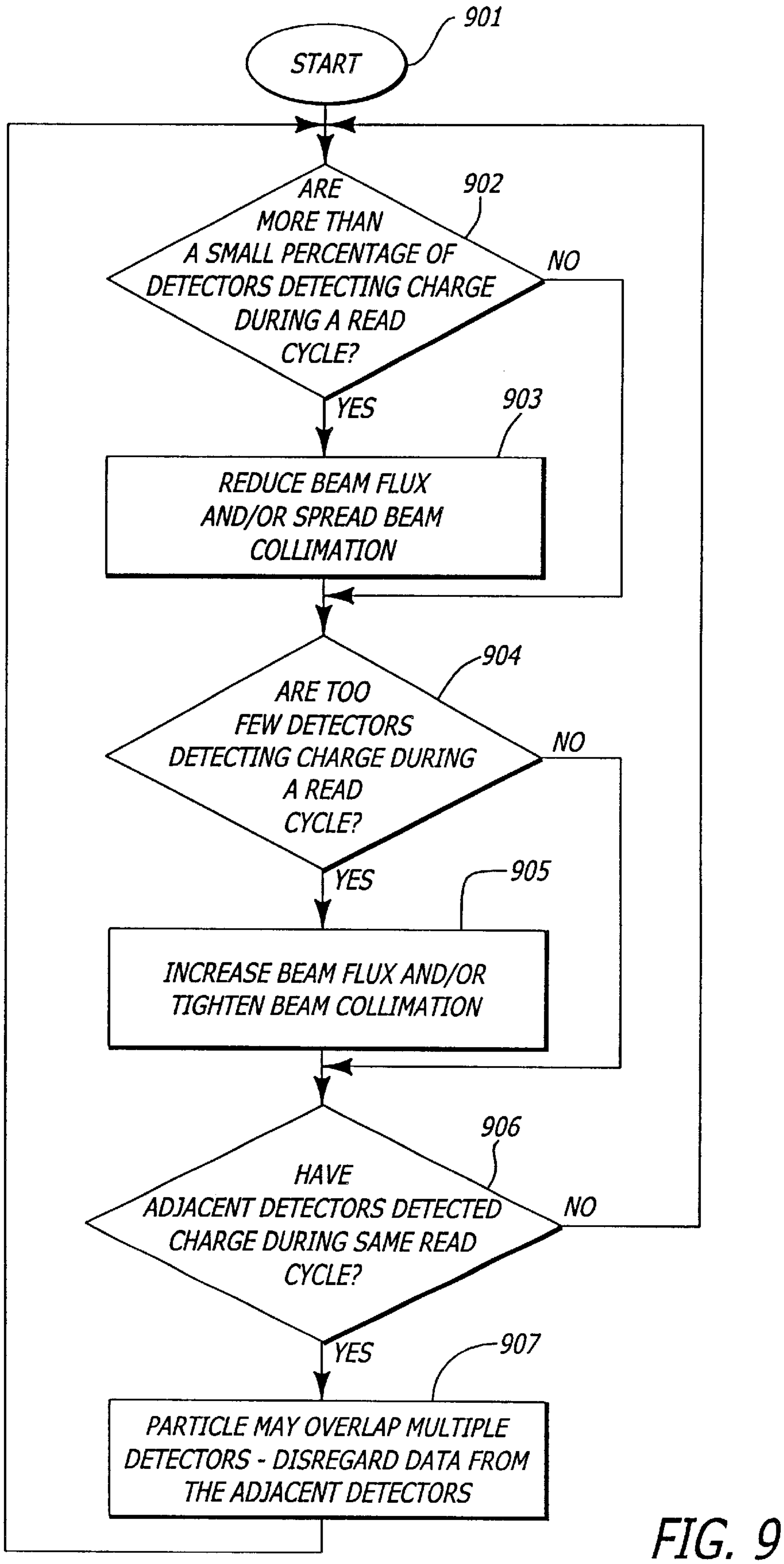
FIG. 9 is a flow chart diagram illustrating one embodiment of a method for analyzing detected charge according to the invention.
Figure 10:
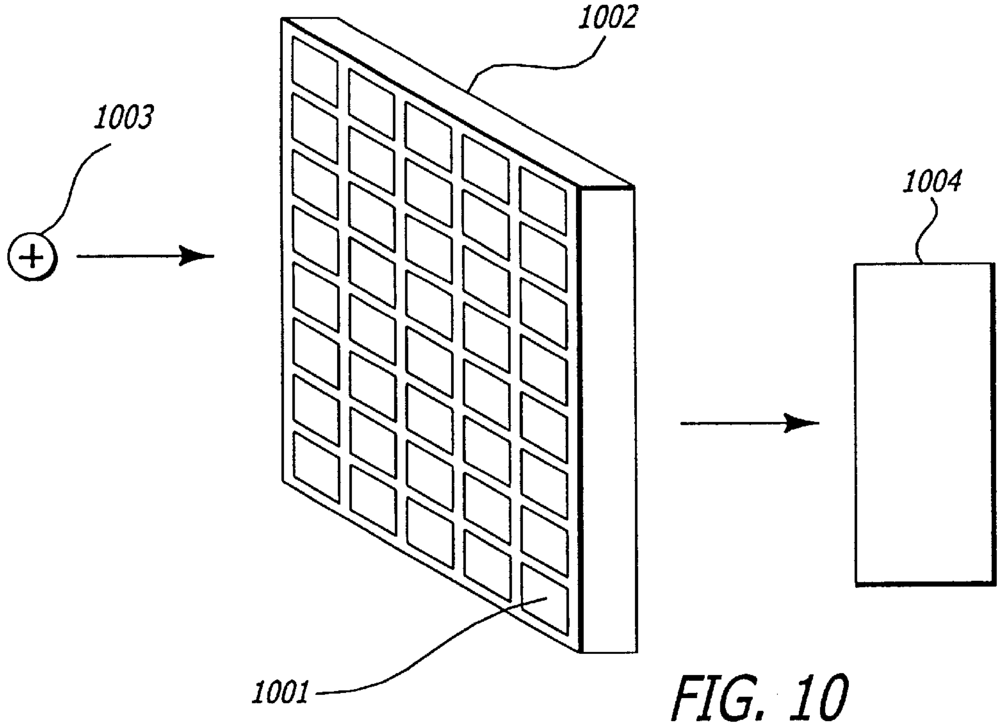
FIG. 10 is a perspective view diagram illustrating one embodiment of a tessellated array detector according to the invention.
Figure 11:
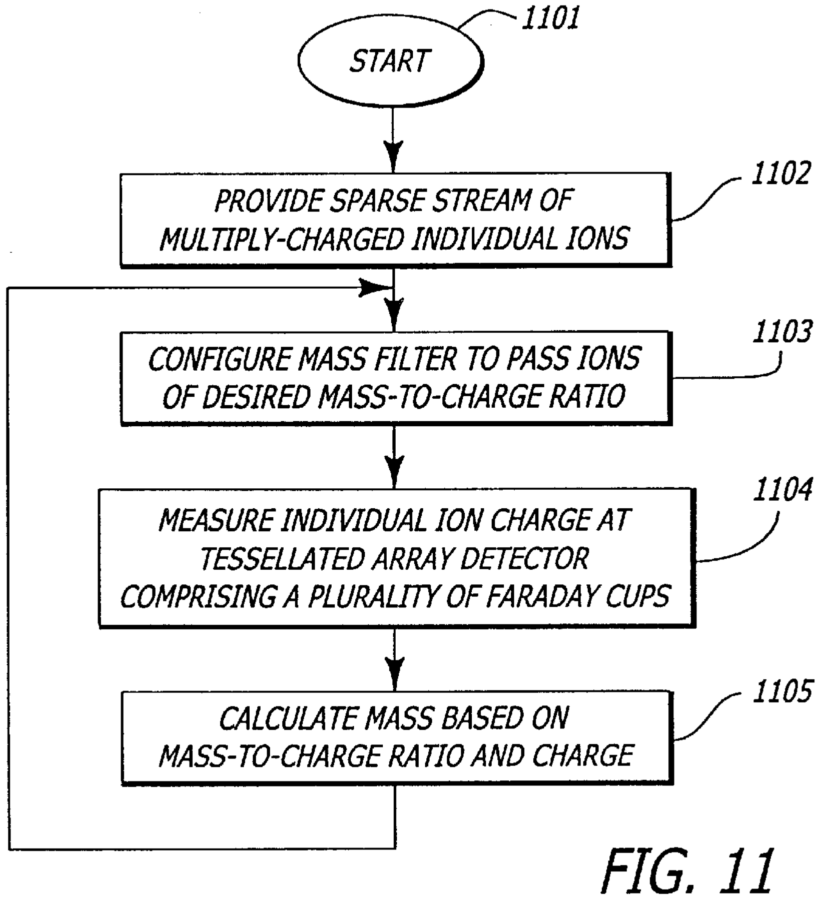
FIG. 11 is a flow chart diagram illustrating one embodiment of a method for charge-detection mass spectrometry with a mass filter analyzer.

FIG. 8 is a flow chart diagram illustrating one embodiment of a method for sensing charge on a detector according to the invention. The method begins in step 801. In step 802, a Faraday cup is reset to a reset voltage and the reset voltage is sampled and held. In step 803, a voltage V1 at the Faraday cup is sampled and held. In step 804, the difference between the voltage V1 and the reset voltage is determined and held. In step 805, charged particles or ions are received at the Faraday cup.

In step 806, a voltage V2 at the Faraday cup is sampled and held. In step 807, the difference between the voltage V2 and the reset voltage is determined and held. In step 808, the difference between the differences determined in steps 804 and 807 is determined and provided at an output. The method then returns to step 802.

We claim:

1. A method for measuring a charge on a single multiply-charged ion, said method comprising:

receiving a single multiply-charged ion at one of a plurality of single ion sensitive Faraday cups; and communicating said charge between said one of said plurality of single ion sensitive Faraday cups and a charge-sensing circuit.

2. The method of claim 1 further comprising:

communicating said charge between said one of said plurality of single ion sensitive Faraday cups and a reference voltage source.

3. The method of claim 2 further comprising:

holding a first voltage representative of said charge communicated between said one of said plurality of single ion sensitive Faraday cups and said charge-sensing circuit;

holding a second voltage representative of said charge communicated between said on of said plurality of single ion sensitive Faraday cups and said reference voltage source; and obtaining a voltage base on the difference between said first voltage and said second voltage.

4. The method of claim 1 further comprising:

providing amplification within said charge-sensing circuit, said charge-sensing circuit being exclusively associated with said one of said plurality of single ion sensitive Faraday cups.

5. The method for analyzing a plurality of charges from single multiply-charged ions detected at a plurality of single ion sensitive Faraday cups, said method comprising:

comparing each of said plurality of charges to a threshold value; and providing an output signal corresponding to each of said plurality of charges having a defined relationship to said threshold value.

6. Apparatus comprising:

a plurality of Faraday cups, said Faraday cups being sufficiently sensitive to measure the charge of a single multiply-charge ion;

a plurality of amplifier circuits, each of said amplifier circuits coupled to a corresponding one of said plurality of Faraday cups.

7. The apparatus of claim 6 wherein said plurality of Faraday cups are arranged as a planar array.

8. The apparatus of claim 7 wherein said plurality of amplifier circuits provide a plurality of outputs, said plurality of outputs being individually accessible.

9. A method for detecting the charge on a single multiply-charged ion comprising;

receiving said single multiply-charged individual ion at an infrared detector array, said infrared detector array comprising a plurality of single ion sensitive infrared detectors.

10. A method for controlling a beam of charged particles comprising:

detecting incidence of said charged particles on a plurality of detectors;

adjusting said beam such that a likelihood of incidence of more than one of said charged particles on any one of said detectors during a read cycle of said detectors is below a threshold.

11. The method of claim 10 wherein said step of adjusting said beam comprises:

adjusting an intensity of said beam.

12. The method of claim 10 wherein said step of adjusting said beam comprises:

adjusting a collimation of said beam.

13. A method for detecting a single multiply-charged ion in a mass spectrometer comprising the steps of:

receiving said single multiply-charged ion at a single ion sensitive Faraday cup of an array detector; and measuring the charge of said single multiply-charged ion at said single ion sensitive Faraday cup of said array detector.

14. Apparatus comprising:

a mass spectrometer for determining the mass of a single multiply-charged ion, said mass spectrometer comprising an array detector, said array detector comprising a plurality of single ion sensitive Faraday cups.

15. Method for performing charge detection mass spectrometry using an array detector comprising:

providing a stream of multiple-charged individual ions;

configuring a mass filter to pass ions of a desired mass-to-charge ration;

measuring individual ion charge at said array detector; and calculating a mass of said individual ions based on said desired mass-to-charge and said individual ion charge.

16. The method of claim 10 wherein said threshold is sufficiently low to infer that the detected incidence is due to a single ion of multiple charge.

17. The method of claim 1 wherein the threshold sensitivity of the single ion sensitive Faraday cup it about 10 electrons to about 100,000 electrons.

18. The method of claim 1 wherein each single ion sensitive Faraday cup has an area of about 100 microns.

* * * * *